(12) United States Patent
Kim et al.

(10) Patent No.: US 10,156,760 B2
(45) Date of Patent: Dec. 18, 2018

(54) LIQUID CRYSTAL DEVICE, METHOD FOR MANUFACTURING A LIQUID CRYSTAL DEVICE, AND METHOD FOR OPERATING A LIQUID CRYSTAL DEVICE

(71) Applicant: Electronics and Telecommunications Research Institute, Daejeon (KR)

(72) Inventors: Sujung Kim, Daejeon (KR); Gi Heon Kim, Daejeon (KR); Yong Hae Kim, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/648,916

(22) Filed: Jul. 13, 2017

(65) Prior Publication Data

US 2018/0136507 A1   May 17, 2018

(30) Foreign Application Priority Data

Nov. 17, 2016   (KR) .......................... 10-2016-0153563

(51) Int. Cl.
*G02F 1/1334*   (2006.01)
*G02F 1/137*    (2006.01)
(Continued)

(52) U.S. Cl.
CPC ........ *G02F 1/13737* (2013.01); *C09K 19/544* (2013.01); *C09K 19/60* (2013.01);
(Continued)

(58) Field of Classification Search
CPC ............... G02F 1/1333; G02F 1/13737; G02F 1/133365; G02F 2001/133637;
(Continued)

(56) References Cited

U.S. PATENT DOCUMENTS

2002/0135860 A1* 9/2002 Iwanaga ............. G02F 1/13725
                                                    359/296
2010/0243970 A1  9/2010 Toshimitsu et al.
(Continued)

FOREIGN PATENT DOCUMENTS

KR   10-2010-0055356 A   5/2010
KR   10-2010-0132309 A   12/2010
(Continued)

OTHER PUBLICATIONS

Farzana Ahmad et al., "Investigation of nonionic diazo dye-doped polymer dispersed liquid crystal film", Bull. Mater. Sci., vol. 35, No. 2, Apr. 2012, pp. 221-231.

*Primary Examiner* — Charles Chang
(74) *Attorney, Agent, or Firm* — Rabin & Berdo, P.C.

(57) ABSTRACT

A method for manufacturing a liquid crystal device includes preparing a precursor solution comprising a monomer, a blue dye, a green dye, and a red dye dissolved in the monomer, and liquid crystal molecules; and polymerizing the monomer of the precursor solution to form a liquid crystal layer. The blue dye, the green dye, and the red dye reflect light of different wavelengths from each other. A black color is available in a single pixel when, based on total amount of the blue dye, the green dye, and the red dye, the blue dye is present in an amount ranging from about 25 wt % to about 30 wt %, the green dye is present in an amount ranging from about 40 wt % to about 50 wt %, and the red dye is present in an amount ranging from about 25 wt % to about 30 wt %.

12 Claims, 4 Drawing Sheets

(51) Int. Cl.
    *C09K 19/60*         (2006.01)
    *G02F 1/1333*      (2006.01)
    *C09K 19/54*         (2006.01)
    *G02F 1/13363*     (2006.01)

(52) U.S. Cl.
    CPC .......... *C09K 19/601* (2013.01); *G02F 1/1333* (2013.01); *G02F 1/1334* (2013.01); *G02F 1/13725* (2013.01); *G02F 1/133365* (2013.01); *G02F 2001/133637* (2013.01)

(58) Field of Classification Search
    CPC ... G02F 1/1334; G02F 1/13725; C09K 19/60; C09K 19/544; C09K 19/601
    See application file for complete search history.

(56) References Cited

U.S. PATENT DOCUMENTS

| | | |
|---|---|---|
| 2010/0309413 A1 | 12/2010 | Jang et al. |
| 2011/0067807 A1 | 3/2011 | Hwang et al. |
| 2012/0113363 A1* | 5/2012 | Lim .................... G02F 1/1334 349/96 |
| 2013/0163067 A1 | 6/2013 | Kim et al. |
| 2014/0160551 A1 | 6/2014 | Kim et al. |

FOREIGN PATENT DOCUMENTS

| | | |
|---|---|---|
| KR | 10-2011-0032639 A | 3/2011 |
| KR | 10-2016-0017060 A | 2/2016 |

\* cited by examiner

LIQUID CRYSTAL DEVICE, METHOD FOR MANUFACTURING A LIQUID CRYSTAL DEVICE, AND METHOD FOR OPERATING A LIQUID CRYSTAL DEVICE

CROSS-REFERENCE TO RELATED APPLICATIONS

This U.S. non-provisional patent application claims priority under 35 U.S.C. § 119 of Korean Patent Application No. 10-2016-0153563, filed on Nov. 17, 2016, the entire contents of which are hereby incorporated by reference.

BACKGROUND

The present disclosure herein relates to a liquid crystal device, and more particularly, to a dye for a liquid crystal device.

Liquid crystal may be a mesophase material between a crystal and a liquid. The name of liquid crystal is derived from the characteristics of flexibility of a liquid and anisotropy of a crystal. Liquid crystal has ordered position and direction of particles in a crystal state. However, liquid crystal has random position and direction in a liquid state.

Liquid crystal may be used in a polymer dispersed liquid crystal (PDLC) display. The PDLC display is an apparatus for scattering or transmitting light by applying an electric field to a uniformly mixed layer of a polymer and liquid crystal and changing the refractive index of the polymer and the liquid crystal.

SUMMARY

The present disclosure provides a liquid crystal device having improved contrast and a method for manufacturing the liquid crystal device.

The present disclosure also provides a liquid crystal device exhibiting improved reproducibility and operation rate, and a method for manufacturing the liquid crystal device.

A liquid crystal device, a method for operating a liquid crystal device, and a method for manufacturing a liquid crystal device are provided. An embodiment of the inventive concept provides a method for manufacturing a liquid crystal device including preparing a precursor solution including a monomer, liquid crystal molecules, a first dye, a second dye, and a third dye, and performing a polymerization process of the precursor solution to form a liquid crystal layer, wherein the first dye, the second dye, and the third dye reflect lights having different wavelengths from each other.

In an embodiment, the method may further include preparing a first electrode, preparing a second electrode, and providing the precursor solution between the first electrode and the second electrode.

In an embodiment, the first electrode and the second electrode may be transparent.

In an embodiment, the first dye may be a blue dye, the second dye may be a green dye, and the third dye may be a red dye.

In an embodiment, the first dye may be from about 25 wt % to about 30 wt % of the first to third dyes, the second dye may be from about 40 wt % to about 50 wt % of the first to third dyes, and the third dye may be from about 25 wt % to about 30 wt % of the first to third dyes.

In an embodiment, the precursor solution may further include an initiator, and the performing of the polymerization process may include applying heat or light to the precursor solution.

In an embodiment, the liquid crystal layer may include a polymer, a liquid crystal group, the first dye, the second dye, and the third dye, the liquid crystal group may include the liquid crystal molecules, and the first dye, the second dye, and the third dye may be separated from the liquid crystal group and dispersed in the polymer.

In an embodiment of the inventive concept, a method for operating a liquid crystal device may include displaying a mixed color of a first dye, a second dye, and a third dye on a liquid crystal layer; and displaying a transparent color on the liquid crystal layer, wherein the liquid crystal device comprising a first electrode, a liquid crystal layer, and a second electrode stacked on a substrate, and wherein the liquid crystal layer comprises a liquid crystal group, the first dye, the second dye, and the third dye.

In an embodiment, the mixed color may be black.

In an embodiment, the first dye may be a blue dye, the second dye may be a green dye, and the third dye may be a red dye.

In an embodiment, the displaying the transparent color may include applying a voltage to the second electrode different from a voltage to the first electrode.

In an embodiment, the displaying of the mixed color may be attained by not applying a voltage to the first electrode and the second electrode.

In an embodiment, displaying the mixed color may include applying first and second voltages to the first and second electrode, respectively, wherein the second voltage is same as the first voltage.

In an embodiment, the liquid crystal group may include a plurality of liquid crystal molecules, and the first dye, the second dye, and the third dye may be separated from the liquid crystal group and dispersed in the liquid crystal layer.

In an embodiment of the inventive concept, a liquid crystal device includes a first substrate, a first electrode on the first substrate, a liquid crystal layer disposed on the first electrode and including a polymer, a liquid crystal group, a blue dye, a green dye, and a red dye, and a second electrode, and a second electrode on the liquid crystal layer, wherein the liquid crystal group includes a plurality of liquid crystal molecules, and the blue dye, the green dye, and the red dye are separated from the liquid crystal group.

In an embodiment, the blue dye may be from about 25 wt % to about 30 wt % of the green dye, the blue dye and the red dye, the green dye may be from about 40 wt % to about 50 wt % of the green dye, the blue dye and the red dye, and the red dye may be from about 25 wt % to about 30 wt % of the green dye, the blue dye and the red dye.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, preferred embodiments of the inventive concept will be explained in detail with reference to the accompanying drawings for the sufficient understanding of the configuration and effects of the inventive concept. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. One of ordinary skill in the art will understand appropriate circumstances in which the concept of the present disclosure may be conducted.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising", when used in this specification, specify the presence of stated components, steps, operations and/or elements, but do not preclude the presence or addition of one or more other components, steps, operations and/or elements.

It will also be understood that when a layer (or film) is referred to as being 'on' another layer (or film) or substrate, it can be directly on the other layer (or film) or substrate, or third intervening layers (or films) may also be present.

It will be understood that, although the terms first, second, third etc. may be used herein to describe various regions, layers (or films), etc. these regions and layers should not be limited by these terms. These terms are only used to distinguish one region or layer (or film) from another region or layer (film). Thus, a first layer discussed below could be termed a second layer. Example embodiments embodied and described herein may include complementary example embodiments thereof. Like reference numerals refer to like elements throughout.

Unless otherwise defined, all terms used herein have the same meaning as commonly understood by one of ordinary skill in the art to which this inventive concept belongs.

Hereinafter, the liquid crystal device according to the inventive concept will be explained.

Figure 1A:
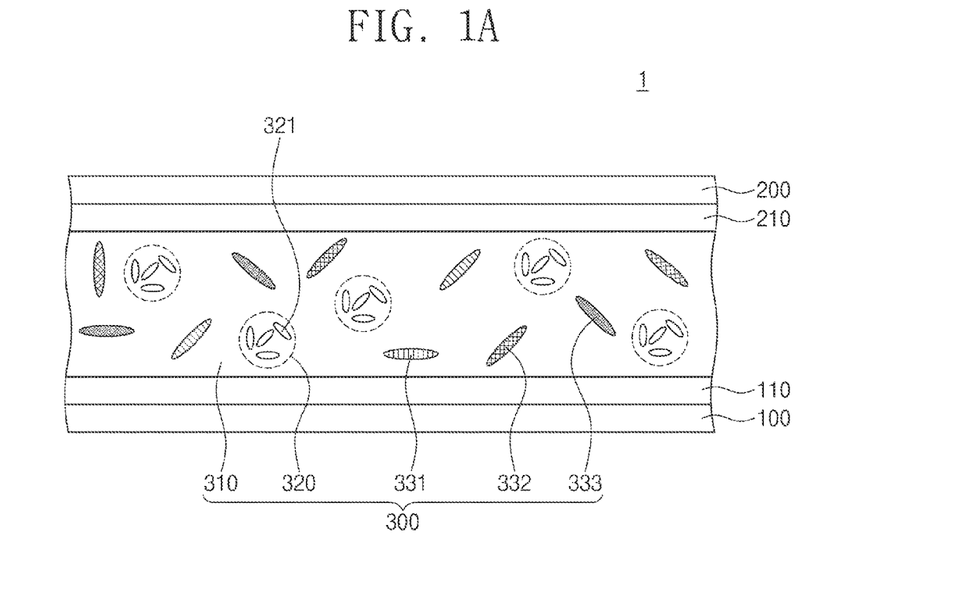
FIG. 1A is a cross-sectional view illustrating a first mode state of a liquid crystal device according to example embodiments.
Figure 1B:
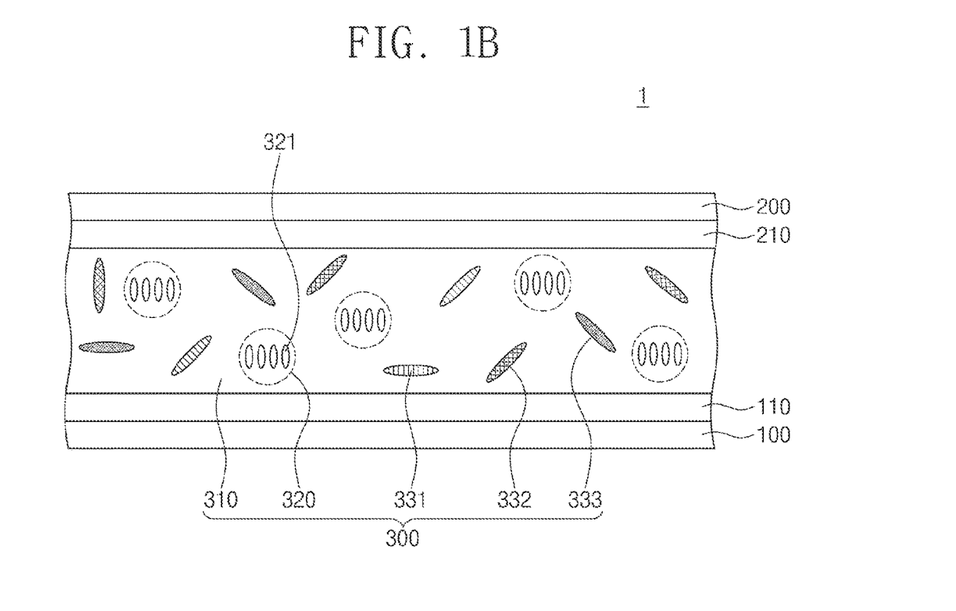
FIG. 1B is a cross-sectional view illustrating a second mode state of a liquid crystal device according to example embodiments.

FIGS. 1A and 1B are cross-sectional views illustrating a liquid crystal device according to example embodiments. FIG. 1A illustrates the first mode state of the liquid crystal device, and FIG. 1B illustrates the second mode state of the liquid crystal device.

Referring to FIGS. 1A and 1B, a liquid crystal device 1 may include a first substrate 100, a first electrode 110, a liquid crystal layer 300, a second electrode 210, and a second substrate 200. The first substrate 100 may be transparent. The first substrate 100 may include glass or a plastic. The first electrode 110 may be disposed on the first substrate 100. The first electrode 110 may include a transparent conductive oxide such as indium tin oxide and indium zinc oxide. Alternatively, the first electrode 10 may include silver nanowire, carbon nanotube, graphene, poly(3,4-ethylenedioxythiophene) polystyrene sulfonate (PEDOT:PSS), polyaniline, or polythiophene. The second electrode 210 may be disposed on the first electrode 110. The second electrode 210 may be separated from the first electrode 110 in a vertical direction. The second electrode 210 may include one of the materials exemplified as the material for the first electrode 110. The second substrate 200 may be disposed on the second electrode 210. The second substrate 200 may be transparent. The second substrate 200 may include glass or a plastic.

The liquid crystal layer 300 may be disposed between the first electrode 110 and the second electrode 210. The liquid crystal layer 300 may include a polymer 310, liquid crystal groups 320, and first to third dyes 331, 332 and 333. The polymer 310 may be filled between the first electrode 110 and the second electrode 210. The polymer 310 may have a shape such as a network. Each of the liquid crystal groups 320 may include liquid crystal molecules 321. The dyes 331, 332 and 333 may include a first dye 331, a second dye 332, and a third dye 333. Each of the first to third dyes 331, 332 and 333 may be dispersed in the polymer 310. The dyes 331, 332 and 333 may have a low solubility with respect to the liquid crystal molecules 321 and may not be provided in the liquid crystal groups 320. The dyes 331, 332 and 333 may be separated from the liquid crystal groups 320. The liquid crystal layer 300 may display a mixed color of the first to third dyes 331, 332 and 333. The first to third dyes 331, 332 and 333 may be dichroic dyes. The first dye 331 may reflect light having a first wavelength. The first wavelength may be from about 450 nm to about 495 nm. The first dye 331 may include a blue dye. In an embodiment, the first dye 331 may be one selected from the group represented by the following Formula 1:

[Formula 1]

Here, $R_1$ may include one of $NC_4H_{10}$, $NC_2H_6$, $NHCH_3$, $NH_2$ or $NA_2$. A may each independently include $C_{3-10}$ alkyl. $R_2$ may include one of H, OH, $CH_3$, $C_2H_5$, linear $C_{3-10}$ alkyl, branched $C_{3-10}$ alkyl, linear $C_{3-10}$ alkene, branched $C_{3-10}$ alkene, or one to ten aromatic groups. $R_5$ may each independently include one of $SO_3Na$ or $SO_3H$. $R_6$ may include one of $NH_2$, $NHCH_3$ or $NHC_6H_5$.

The second dye 332 may reflect light having a second wavelength. The second wavelength may be different from the first wavelength. The second wavelength may be from about 490 nm to about 570 nm. The second dye 332 may include a green dye. In an embodiment, the second dye 332 may be represented by the following Formula 2:

[Formula 2]

-continued

The third dye 333 may reflect light having a third wavelength. The third wavelength may be different from the first wavelength and the second wavelength. For example, the third wavelength may be from about 620 nm to about 780 nm. The third dye 333 may include a red dye. The third dye 333 may include any one represented by the following Formula 3:

[Formula 3]

Here, $R_7$ and $R_8$ may be each independently selected from any one selected from the group represented by the following Formula 2a:

[Formula 2a]

Here, $R_7$ may include one of Cr, Mo, W, Mn, V, Nb or Ta. $R_8$, $R_9$, $R_{10}$ and $R_{11}$ may each independently include $NO_2$, $NH_3$, $NHCH_3$, $NC_4H_{10}$, $NC_2H_6$, $NB_2$, and one to ten aromatic groups. $R_{12}$ may include one of $SO_3Na$ or $SO_3H$. $R_{13}$ may include one of COOH or COONa. $R_{14}$ and $R_{15}$ may each independently include one of H, $CH_3$, $C_2H_5$, linear $C_{3-10}$ alkyl, branched $C_{3-10}$ alkyl, linear $C_{3-10}$ alkene, branched $C_{3-10}$ alkene, $NC_4H_{10}$, $NC_2H_6$, $NHCH_3$, $NH_2$, $NB_2$ or one to ten aromatic groups. $R_{16}$ may include one of H, OH, $SO_3H$, or COOH. B may each independently include $C_{3-10}$ alkyl.

Hereinafter, the operation of a liquid crystal device will be explained.

Referring to FIG. 1A, a liquid crystal device 1 may be a first mode state. Between a first electrode 110 and a second electrode 210, a voltage difference may not be generated. In an embodiment, a voltage may not be applied to the first electrode 110 and the second electrode 210. In another embodiment, a first voltage may be applied to the first electrode 110. A second voltage may be applied to the second electrode 210, and the second voltage may be the same as the first voltage.

Liquid crystal molecules 321 may be irregularly aligned without orientation. Liquid crystal molecules 321 may have a different refractive index from a polymer 310. Due to the difference of the refractive index between the liquid crystal molecules 321 and the polymer 310, light may be scattered/reflected by a liquid crystal layer 300, for example, first to third dyes 331, 332 and 333. The liquid crystal device 1 may display a mixed color of the first to third dyes 331, 332 and 333. For example, the liquid crystal device 1, for example, the liquid crystal layer 300 may display black. The color of the liquid crystal layer 300 may be adjusted by controlling the mixing ratio of the first dye 331, the second dye 332 and the third dye 333. For example, the first dye 331 may be from about 25 wt % to about 30 wt % of the first to third dyes 331, 332 and 333. The second dye 332 may be from about 40 wt % to about 50 wt % of the first to third dyes 331, 332 and 333. The third dye 333 may be from about 25 wt % to about 30 wt % of the first to third dyes 331, 332 and 333. If the contents of the first dye 331, the second dye 332 and the third dye 333 deviate from the above-described ranges, the liquid crystal layer 300 may not display black color.

In another embodiment, one of the first to third dyes 331, 332 and 333 may be omitted. For example, the liquid crystal layer 300 may include the first and second dyes 331 and 332. In this case, the liquid crystal layer 300 may display a mixed color of the first and second dyes 331 and 332. In another embodiment, the liquid crystal layer 300 may further include a fourth dye (not shown) and display a mixed color of the first dye 331, the second dye 332, the third dye 333 and the fourth dye.

As shown in FIG. 1B, a liquid crystal device 1 may be a second mode state. Between the first electrode 110 and the second electrode 210, a voltage difference may be generated. For example, a first voltage may be applied to the first electrode 110. A third voltage may be applied to the second electrode 210, and the third voltage may be different from the first voltage. Liquid crystal molecules 321 may be regularly aligned with orientation. For example, the long axes of the liquid crystal molecules 321 may be aligned. The liquid crystal molecules 321 in the second mode state may have more similar refractive index to that of the polymer 310 than in the first mode state. First to third dyes 331, 332 and 333 may reflect light with different amounts or different wavelengths according to the polarization of incident light. Accordingly, light may pass through a liquid crystal layer 300, and the liquid crystal device 1 may be transparent.

A black dye may be easily mixed with the liquid crystal molecules 321 and may be provided in liquid crystal groups 320. During the change of the orientation of the liquid crystal molecules 321, the black dye may inhibit the movement of the liquid crystal molecules 321. According to example embodiments, the first to third dyes 331, 332 and 333 may not be mixed with the liquid crystal molecules 321 but may be dispersed in the polymer 310. During the operation of the liquid crystal device 1, the first to third dyes 331, 332 and 333 may not inhibit the movement of the liquid crystal molecules 321. Therefore, the liquid crystal device 1 may exhibit improved reproducibility and may have rapid response time. The liquid crystal device 1 may exhibit improved contrast.

Different from the above description, a voltage difference may be generated between the first electrode 110 and the second electrode 210 in the first mode state, and a voltage difference may not be generated between the first electrode 110 and the second electrode 210 in the second mode state.

Figure 2A:
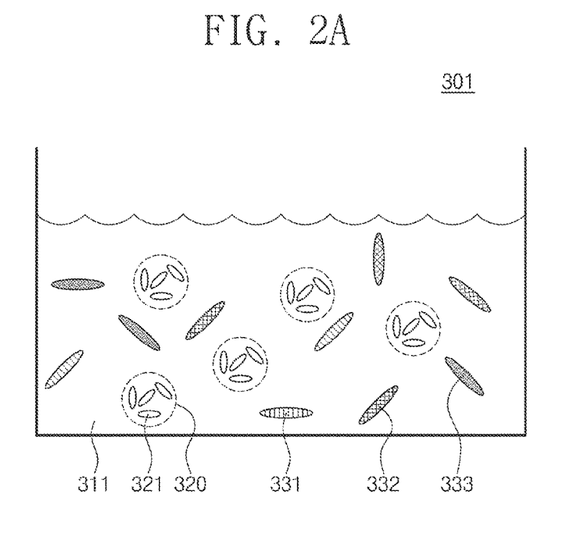
FIGS. 2A and 2B are cross-sectional views illustrating a method for manufacturing a liquid crystal device according to an embodiment.
Figure 2B:
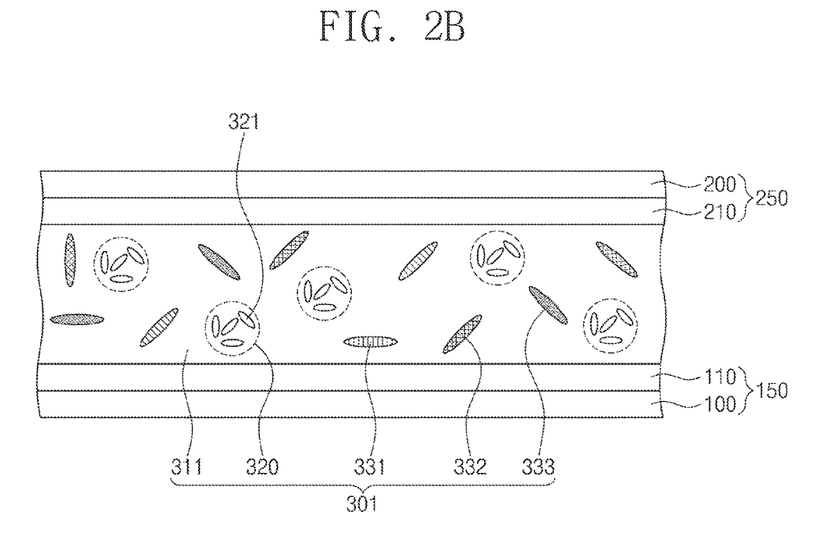

FIGS. 2A and 2B are cross-sectional views illustrating a method for manufacturing a liquid crystal device according to an embodiment.

Referring to FIG. 2A, a first dye 331, a second dye 332, a third dye 333 and an initiator may be added to a monomer solution 311. The first to third dyes 331, 332 and 333 may be dissolved in the monomer solution 311. For example, the monomer solution 311 may include triethylopropane triacrylate (TMPTA), tri(propylene glycol) diacrylate (TPGDA), pentaerythritol triacrylate (PETA), trimethylolpropane ethoxylate triacrylate (TMPEOTA), methyl methacrylate (MMA), methacrylate (MA), tri(propylene glycol) glycerolate diacrylate (TPGDA), vinylacrylate (VA), ethylene glycol dimethacrylate (EGDA), or epoxy acrylate monomer or oligomer. The initiator may include a thermal initiator or a photoinitiator. For example, the photoinitiator may include 1-hydroxy-cyclohexyl-phenyl-ketone, 2-methyl-1[4-(methylthio)phenyl]-2-morpholinopropane-1-one, 2-hydroxy-2-methyl-1-phenyl-propane-1-one, benzophenone, 2-hydroxy-1-[4-(2-hydroxyethoxy)phenyl]-2-methyl-1-propanone, methylbenzoylformate, alpha, alpha-dimethoxy-alpha-phenylacetophenone, 2-benzyl-2-(dimethylamino)-1-[4-(morpholinyl) phenyl]-1-butanone, diphenyl (2,4,6-trimethylbenzoyl)-phosphine oxide, phenyl bis(2,4,6-trimethyl benzoyl) phosphine oxide, bis(.eta.5-2,4-cyclopentadien-1-yl) bis [2,6-difluoro-3-(1H-pyrrol-1-yl) phenyl] titanium, 1-hydroxy-cyclohexylphenyl-ketone (CPA), or a mixture thereof. The thermal initiator may include benzoyl peroxide (BP), acetyl peroxide (AP), dilauryl peroxide (DP), di-tert-butyl peroxide (t-BTP), cumyl hydroperoxide (CHP), hydrogen peroxide (HP), potassium peroxide (PP), 2,2'-azobisisobutyronitrile (AIBN), an azo compound initiator, silver alkyls, or a mixture thereof.

After that, the liquid crystal molecules 321 are added to the monomer solution 311 to prepare a precursor solution 301. The liquid crystal molecules 321 may form the liquid crystal groups 320. The first to third dyes 331, 332 and 333 may not be mixed with the liquid crystal molecules 321. For example, the first to third dyes 331, 332 and 333 may not be provided in the liquid crystal groups 320 and may be disposed between the liquid crystal groups 320. High frequency vibration or heat may be applied to the precursor solution 301, and the first to third dyes 331, 332 and 333, and the liquid crystal groups 320 may be uniformly dispersed in the precursor solution 301.

Referring to FIG. 2B, a first electrode structure 150 and a second electrode structure 250 may be prepared. The first electrode structure 150 may include a first substrate 100 and a first electrode 110 which are stacked. The second electrode structure 250 may include a second substrate 200 and a second electrode 210 which are stacked. The second electrode structure 250 may be separated from the first electrode structure 150. The second electrode 210 may face the first electrode 110. The precursor solution 301 may be provided between the first electrode 110 and the second electrode 210.

Referring to FIG. 2B together with FIG. 1A, heat or light may be applied onto the precursor solution 301. A monomer 301 may be polymerized to form a polymer 310. For example, the application of heat onto the precursor solution 301 may be conducted at from about 90° C. to about 120° C. Then, a liquid crystal layer 300 may be formed. Liquid crystal molecules 320 are aligned without orientation, but the liquid crystal molecules 320 may have orientation as shown in FIG. 1B.

Figure 3:
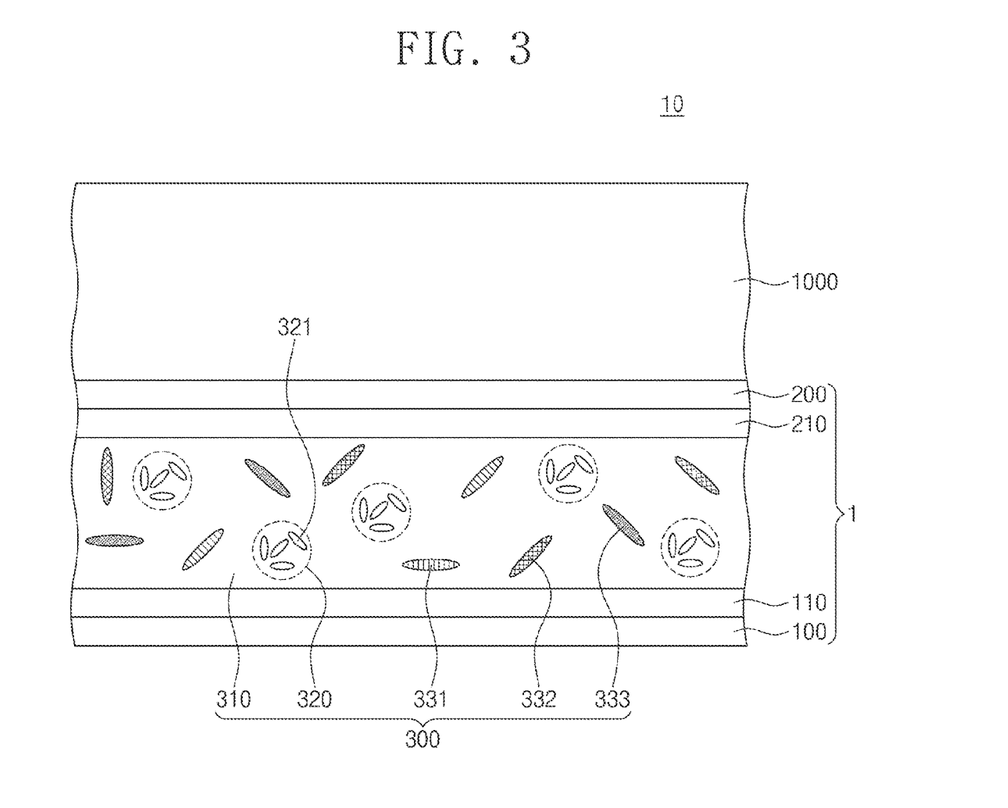
FIG. 3 is a cross-sectional view illustrating a display apparatus according to an embodiment.

FIG. 3 is a cross-sectional view illustrating a display apparatus according to an embodiment. Hereinafter, duplicated contents as the above-described explanation will be omitted.

Referring to FIG. 3, a display apparatus 10 may include a light emitting device 1000 and a liquid crystal device 1. The light emitting device 1000 may include a liquid crystal display (LCD) device, a field emission display (FED) device, a plasma display panel (PDP) device, or an organic light emitting diode. The light emitting device 1000 may emit light toward the liquid crystal device 1.

The liquid crystal device 1 may be provided on the light emitting device 1000. The liquid crystal device 1 may be the same as explained in FIGS. 1A and 1B. Due to the voltage difference between a first electrode 110 and a second electrode 210, the first mode state and the second mode state of the liquid crystal device 1 may be controlled. Light may not pass through the liquid crystal device 1 in the first mode state, but may pass through the liquid crystal device 1 in the second mode state. Accordingly, the on and off states of the display apparatus 10 may be controlled.

Figure 4:
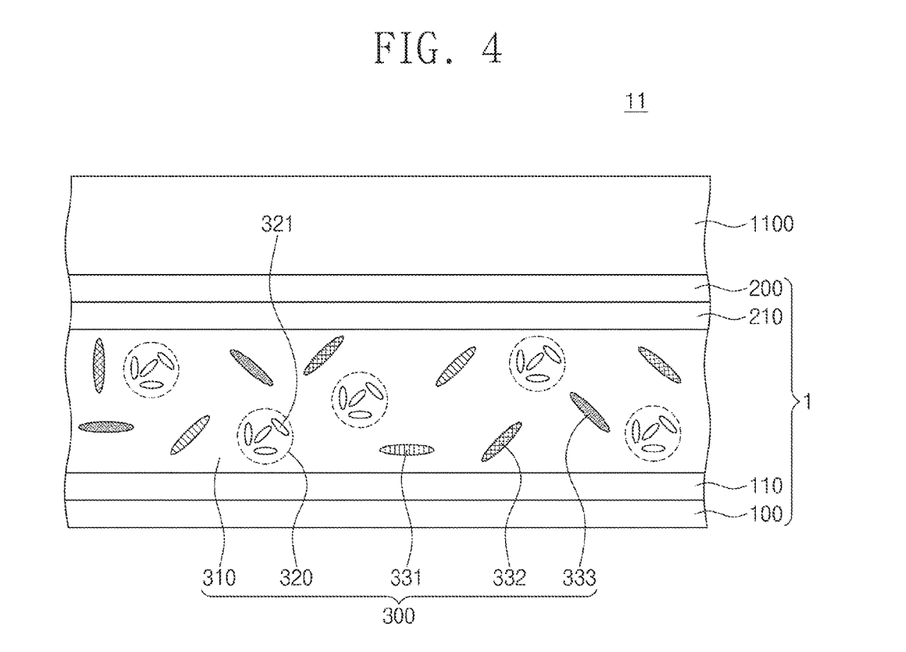
FIG. 4 is a cross-sectional view illustrating a window according to an embodiment.

FIG. 4 is a cross-sectional view illustrating a window according to an embodiment. Hereinafter, duplicated contents as the above-described explanation will be omitted.

Referring to FIG. 4, a window 11 may include a glass layer 1100 and a liquid crystal device 1. The glass layer 1100 may be transparent. The liquid crystal device 1 may be provided on the glass layer 1100. Light may pass through the glass layer 1100 and may be incident to the liquid crystal device 1. Light may not pass through the liquid crystal device 1 in the first mode state, but may pass through the liquid crystal device 1 in the second mode state. Accordingly, the on and off states of the window 11 may be controlled.

According to the inventive concept, a liquid crystal layer may include a first dye, a second dye, and a third dye. The first to third dyes may show different colors from each other. In the first mode state of a liquid crystal device, the liquid crystal layer may display a mixed color of the first dye, the second dye, and the third dye. In the second mode state of a liquid crystal device, the liquid crystal layer may display a transparent color. The liquid crystal layer may include the first dye, the second dye, and the third dye to display even more improved contrast. The first dye, the second dye, and the third dye may not inhibit the movement of liquid crystal molecules. The liquid crystal device may exhibit improved reproducibility and rapid operation rate.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method for manufacturing a liquid crystal device, the method comprising:
preparing a precursor solution comprising a monomer, a blue dye, a green dye, and a red dye dissolved in the monomer, and liquid crystal molecules; and
polymerizing the monomer of the precursor solution to form a liquid crystal layer,
wherein the blue dye, the green dye, and the red dye reflect light of different wavelengths from each other, and
wherein, a black color is available in a single pixel when, based on total amount of the blue dye, the green dye, and the red dye, the blue dye is present in an amount ranging from about 25 wt % to about 30 wt %, the green dye is present in an amount ranging from about 40 wt % to about 50 wt %, and the red dye is present in an amount ranging from about 25 wt % to about 30 wt %.

2. The method for manufacturing a liquid crystal device of claim 1, further comprising:
preparing a first electrode;
preparing a second electrode; and
providing the precursor solution between the first electrode and the second electrode.

3. The method for manufacturing a liquid crystal device of claim 2, wherein the first electrode and the second electrode are transparent.

4. The method for manufacturing a liquid crystal device of claim 1, wherein the precursor solution further comprises an initiator, and polymerizing the monomer comprises applying heat or light to the precursor solution.

5. The method for manufacturing a liquid crystal device of claim 1, wherein the liquid crystal layer comprises a polymer, a liquid crystal group, and the blue dye, the green dye, and the red dye are dissolved in the polymer after the monomer is polymerized to provide the polymer,
the liquid crystal group comprises the liquid crystal molecules, and
the blue dye, the green dye, and the red dye are separated from the liquid crystal group and are dispersed in the polymer.

6. A method for operating a liquid crystal device that comprises a substrate; a first electrode provided on the substrate; a liquid crystal layer including a blue dye, a green dye, and a red dye dissolved in a polymer and a liquid crystal group provided on the first electrode; and a second electrode provided on the liquid crystal layer, the method comprising:
displaying a mixed color of the blue dye, the green dye, and the red dye on the liquid crystal layer; and
displaying a transparent color on the liquid crystal layer,
wherein, the mixed color is black when, based on total amount of the blue dye, the green dye, and the red dye, the blue dye is present in an amount ranging from about 25 wt % to about 30 wt %, the green dye is present in an amount ranging from about 40 wt % to about 50 wt %, and the red dye is present in an amount ranging from about 25 wt % to about 30 wt %.

7. The method for operating a liquid crystal device of claim 6, wherein the mixed color is black and is displayed in a single pixel.

8. The method for operating a liquid crystal device of claim 6, wherein displaying a transparent color comprises applying a voltage to the second electrode that is different from a voltage applied to the first electrode.

9. The method for operating a liquid crystal device of claim 8, wherein displaying a mixed color is attained by not applying a voltage to the first electrode and the second electrode.

10. The method for operating a liquid crystal device of claim 8, wherein displaying a mixed color comprises applying first and second voltages to the first and second electrode, respectively, and wherein the first voltage and the second voltage are identical.

11. The method for operating a liquid crystal device of claim 6, wherein the liquid crystal group comprises a plurality of liquid crystal molecules, and the blue dye, the green dye, and the red dye are separated from the liquid crystal group and are dispersed in the liquid crystal layer.

12. A liquid crystal device, comprising:
a first substrate;
a first electrode provided on the first substrate;

a liquid crystal layer disposed on the first electrode and comprising a polymer, a liquid crystal group, and a blue dye, a green dye, and a red dye dissolved in the polymer; and a second electrode provided on the liquid crystal layer, wherein the liquid crystal group comprises a plurality of liquid crystal molecules, and the blue dye, the green dye, and the red dye are separated from the liquid crystal group, and wherein, a black color is available in a single pixel when, based on total amount of the blue dye, the green dye, and the red dye, the blue dye is present in an amount ranging from about 25 wt % to about 30 wt %, the green dye is present in an amount ranging from about 40 wt % to about 50 wt %, and the red dye is present in an amount ranging from about 25 wt % to about 30 wt %.

* * * * *